No. 639,107. Patented Dec. 12, 1899.
R. SORENSEN.
SAIL ATTACHMENT FOR BICYCLES.
(Application filed June 21, 1899.)
(No Model.) 2 Sheets—Sheet 1.
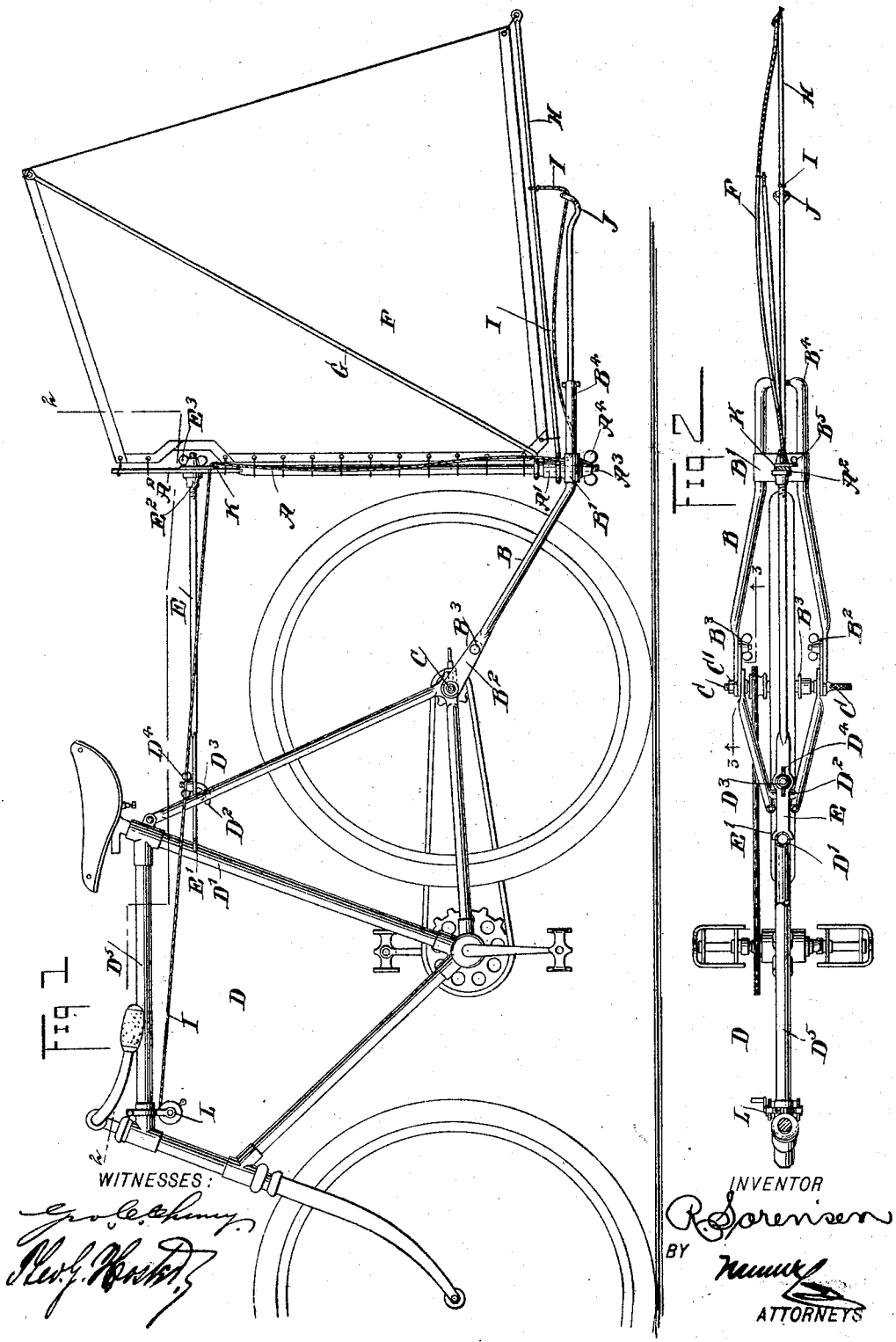

No. 639,107. Patented Dec. 12, 1899.
R. SORENSEN.
SAIL ATTACHMENT FOR BICYCLES.
(Application filed June 21, 1899.)
(No Model.) 2 Sheets—Sheet 2.
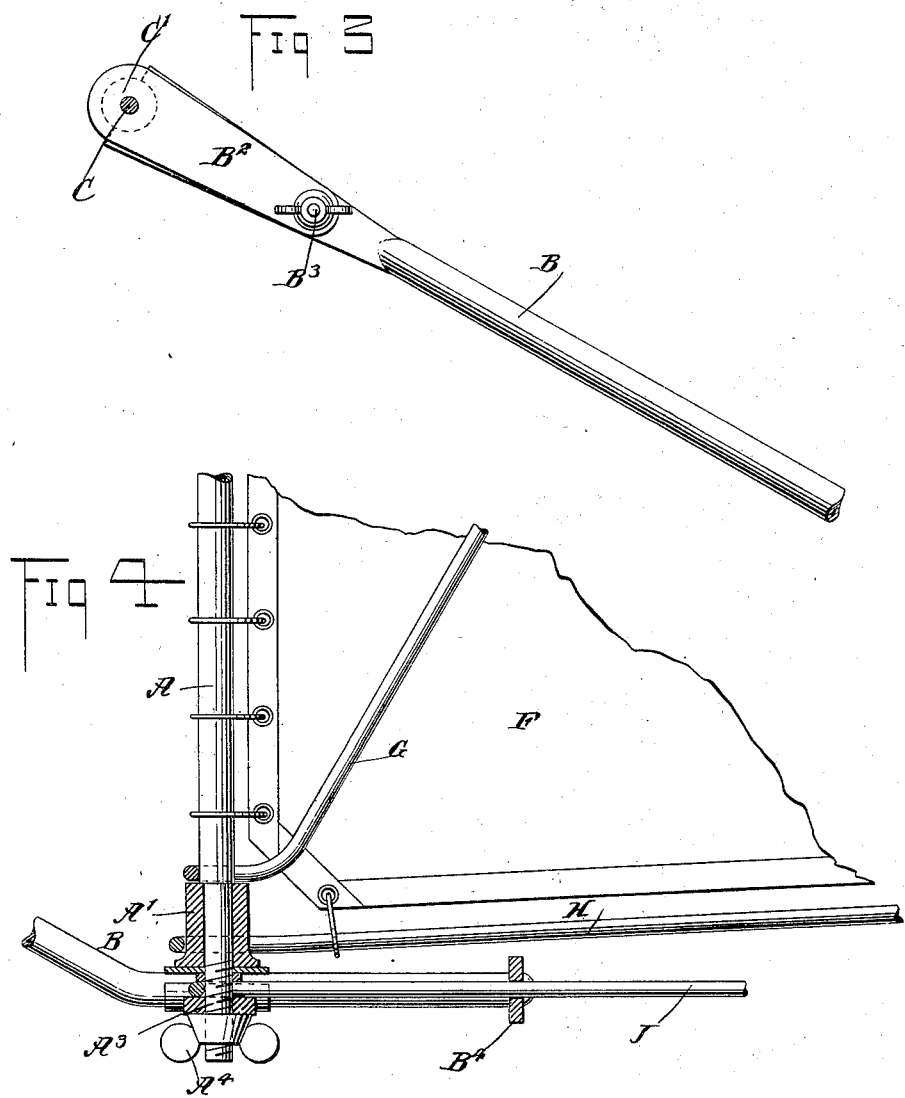
WITNESSES:
INVENTOR
R. Sorensen
BY
ATTORNEYS

UNITED STATES PATENT OFFICE.

RUDOLPH SORENSEN, OF ORD, NEBRASKA.

SAIL ATTACHMENT FOR BICYCLES.

SPECIFICATION forming part of Letters Patent No. 639,107, dated December 12, 1899.

Application filed June 21, 1899. Serial No. 721,286. (No model.)

*To all whom it may concern:*

Be it known that I, RUDOLPH SORENSEN, of Ord, in the county of Valley and State of Nebraska, have invented a new and Improved Sail Attachment for Bicycles, of which the following is a full, clear, and exact description.

The object of the invention is to provide a new and improved sail attachment for bicycles, and which is simple and durable in construction, readily applied to an ordinary bicycle, and arranged to utilize the force of the wind to assist in propelling the bicycle forward.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a side elevation of the improvement. Fig. 2 is a sectional plan view of the same on the line 2 2 in Fig. 1. Fig. 3 is an enlarged sectional side elevation of the device for fastening the bottom support for the mast to the rear axle of the bicycle, the section being on the line 3 3 in Fig. 2; and Fig. 4 is an enlarged sectional side elevation of the device for fastening the mast to the support.

The improved sail attachment is provided with a mast A, formed at its lower end with a base A', resting on a transverse plate B', forming part of a forked support B, secured to the rear axle C of the bicycle D, of any approved construction and extending rearwardly and downwardly therefrom, as shown in Fig. 1. Each member of the forked support B abuts with its forward end against a nut C', screwing on the axle C, and on the latter is hung an arm $B^2$, connected by a bolt $B^3$ with the member of the support, as is plainly indicated in Fig. 3. The arm $B^2$ is adapted to be clamped against the bicycle-frame by screwing up the nut C', so that said arm is rigidly held in place, and consequently holds the support B against turning or swinging, as the support is secured to the now fixed arm $B^2$ and abuts against the peripheral surface of the nut C'. The upper portion $A^2$ of the mast A is flattened and is engaged by a brace E, extending horizontally forwardly between the members of the upper rear fork of the bicycle to fit with its forward forked end E' upon the center post D' of the bicycle-frame, as is plainly shown in Figs. 1 and 2.

The brace E, at the rear of the fork E', rests on a cross-piece $D^2$, connecting the members of the rear upper fork with each other, and the said brace is engaged by a bolt $D^3$, extending from the cross-bar $D^2$ upwardly, to carry on its upper end a nut $D^4$, screwing down upon the brace to securely hold the same approximately in a horizontal position. The outer end of the brace is threaded, and on the threaded portion are two nuts $E^2$ $E^3$ for engaging the flattened portion $A^2$ of the mast to hold the same approximately in a vertical position.

On the mast A is mounted in the usual manner a sail F, provided with a support G and held at its lower end on the usual boom H, fulcrumed on the base A' of the mast, and said boom is engaged by a sheet I, sliding in a stern-sprit J, supported in an extension $B^4$ of the support and engaging a bolt $A^3$, projecting from the base A' through the plate B', a nut $A^4$ screwing on the bolt against the under side of the stern-sprit, as will be readily understood by reference to Fig. 4. The sheet I extends over the stern-sprit J and then passes through an opening $B^5$ in the plate B', upward and through a guide-plate K, held on the threaded end of the brace E between the flattened portion $A^2$ of the mast A and the nut $E^3$. The sheet then extends forward to wind on a reel L, somewhat of the nature of a fishing-reel and secured to the forward end of the upper brace $D^5$ of the bicycle-frame, so as to be within convenient reach of the rider's hand.

When the rider unwinds the sheet I from the reel L, the sail F is free to assume an inclined position relatively to the longitudinal vertical plane of the bicycle, and when the operator winds up the sheet I on the reel L, then the sheet pulls on the boom H to bring the sail into the plane of the bicycle in case the bicycle is traveling against the wind, as no use can be made of the sail at this time. When, however, the wind is blowing in the direction of the travel of the bicycle or at one side thereof, then the operator unwinds the sheet I to allow the sail F to assume a normal position to cause the force of the wind to act on the sail in order to assist in the propulsion of the bicycle in a forward direction.

By the above-described construction the attachment can be quickly and readily applied or removed. The sail will be so supported that a portion of it will be below the axle of the bicycle, thus balancing the wheel and permitting it to run steady and straight.

Having thus fully described my invention, I claim as new and desire to secure by Letters Patent—

1. A sail attachment for a bicycle, comprising a mast, a support for carrying the mast and arranged for removable connection with the bicycle-frame, the support for the lower end of the mast being in a lower plane than the rear axle of the bicycle, and a sail carried by said mast, substantially as shown and described.

2. A sail attachment for a bicycle, comprising a mast, a base-support for said mast and arranged for attachment to the rear axle of the bicycle so as to be in a lower plane than the axle, a brace for the upper end of the mast and arranged for attachment to the bicycle-frame, and a sail carried by said mast, substantially as shown and described.

3. A sail attachment for a bicycle, comprising a mast, a base-support for said mast and arranged for attachment to the rear axle of the bicycle so as to be in a lower plane than the axle, a brace for the upper end of the mast and arranged for attachment to the bicycle-frame, a sail carried by said mast, a sheet for engagement with the boom of the sail, and a reel carried on the bicycle-frame for winding up and unwinding said sheet, substantially as shown and described.

4. In a sail attachment for a bicycle, a mast, a sail carried by said mast, a support for the lower end of said mast and in the shape of a fork, and an arm carried by each fork member and adapted to engage the rear axle of the bicycle, the end of the fork abutting against the nut of the rear axle, substantially as shown and described.

5. A sail attachment for bicycles, comprising a mast, a sail adapted to be carried by the mast, a support for the lower end of the mast and arranged for attachment to the rear axle of the bicycle so as to be in a lower plane than the axle, a brace connected with the upper end of the mast and having a forked forward end for abutting against the center post of the bicycle-frame, and a support for said brace on the frame of the bicycle, substantially as shown and described.

6. A sail attachment for bicycles, comprising a fork adapted to be secured to the rear axle of a bicycle so as to extend rearwardly therefrom, a mast having its lower end supported upon the fork, a brace secured to the upper end of the mast and having its forward end provided with means for locking it to the bicycle-frame, a boom on the lower end of the mast, a sail secured to the mast and boom, a stern-sprit extending from the rear end of the said fork, and a sheet secured to the boom and working in a guide of the stern-sprit, substantially as herein shown and described.

7. A sail attachment for bicycles, comprising an arm constructed to be secured to the rear axle to extend downwardly and rearwardly therefrom, a mast mounted on the outer end of the arm, a brace secured to the upper end of the mast and provided with means for securing it to the bicycle-frame, a boom mounted on the lower end of the mast, and a sail carried by the mast and boom, substantially as described.

8. A sail attachment for bicycles, comprising a fork constructed to be secured to the rear axle to extend downwardly and rearwardly therefrom, a mast mounted on the outer end of the fork, a brace having one end secured to the upper end of the mast and provided at its other end with means for securing it to the bicycle-frame, a boom mounted on the lower end of the mast, a sail secured to the mast and boom, and an inclined support having one end loosely mounted on the mast and its other end connected to the upper part of the sail, substantially as described.

RUDOLPH SORENSEN.

Witnesses:
 THOMAS L. HALL,
 ALONZO J. FIRKINS.